United States Patent [19]

King et al.

[11] Patent Number: 4,764,334

[45] Date of Patent: Aug. 16, 1988

[54] VISUAL INSPECTION SYSTEM FOR RADIOACTIVE FUEL ASSEMBLIES USING FIBEROPTICS

[75] Inventors: William E. King, Plum Boro, Pa.; Lawrence G. Healy, Horseheads, N.Y.

[73] Assignee: Westinghouse Electric Corp., Pittsburgh, Pa.

[21] Appl. No.: 542,612

[22] Filed: Oct. 17, 1983

[51] Int. Cl.⁴ .............................................. G21C 17/00
[52] U.S. Cl. ...................................... 376/248; 376/249
[58] Field of Search ............... 376/248, 249, 252, 251; 350/96.26; 356/241

[56] References Cited

U.S. PATENT DOCUMENTS

| | | | |
|---|---|---|---|
| 3,265,584 | 8/1966 | Cooper | 376/248 |
| 3,434,775 | 3/1969 | Grosselin | 356/241 |
| 3,710,091 | 1/1973 | Holcomb | 350/96.26 |
| 3,724,922 | 4/1973 | Jones | 350/96.26 |
| 3,856,000 | 12/1974 | Chikama | 350/96.26 |
| 4,036,686 | 7/1977 | Weilbacher et al. | 376/251 |
| 4,174,255 | 11/1979 | Lawrie | 376/252 |
| 4,229,069 | 10/1980 | Motin et al. | 376/248 |
| 4,253,447 | 3/1981 | Moore et al. | 350/96.26 |
| 4,255,762 | 3/1981 | Takeyasu et al. | 358/100 |
| 4,281,929 | 8/1981 | Lord et al. | 356/241 |
| 4,286,585 | 9/1981 | Ogawa | 356/241 |
| 4,311,556 | 1/1982 | Iwamoto et al. | 376/249 |
| 4,313,791 | 2/1982 | Lawrie et al. | 376/252 |
| 4,432,931 | 2/1984 | Lockett | 376/248 |
| 4,464,332 | 8/1984 | Boisseuil et al. | 376/248 |

FOREIGN PATENT DOCUMENTS 56-19020  2/1981  Japan.
2153549   8/1985  United Kingdom.

OTHER PUBLICATIONS

"Lasers and Fiberoptics", Laser Focus, (6/67) vol. 3, No. 13, pp. 20-26, Kapany
Design News/11-20-78/63, Stengel, "Mirror, Rod Optic Inspect Deep Bores", UCRL-52431, 2/22/78, Lord et al.

Primary Examiner—Salvatore Cangialosi

[57] ABSTRACT

A visual inspection system is described for radioactive nuclear fuel assemblies using fiberoptic technology. The system is provided in an underwater environment in a spent fuel pool and includes a radiation resistant fiberscope/closed circuit television camera system coupled to a three axes manipulator system. The fiberscope includes a radiation resistant fiberoptic image guide having a core manufactured of ultrapure silicon dioxide material so as to minimize transmission losses. The system provides the capability of performing visual inspection of the interior of radioactive nuclear fuel assemblies having channels formed between adjacent fuel elements as small as 0.070 inches. The fuel elements to be visually inspected are illuminated by a laser coupled to a fiberoptic light guide arranged adjacent to the fiberoptic image guide.

25 Claims, 6 Drawing Sheets

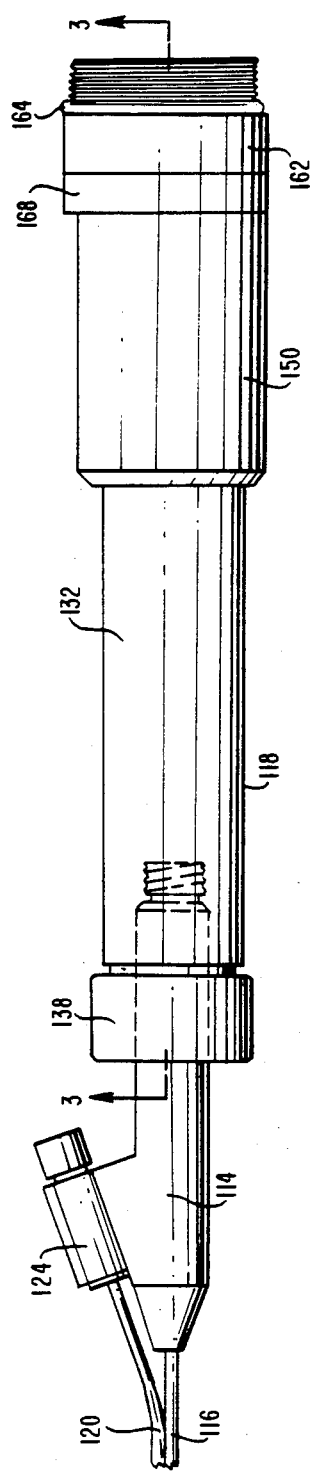
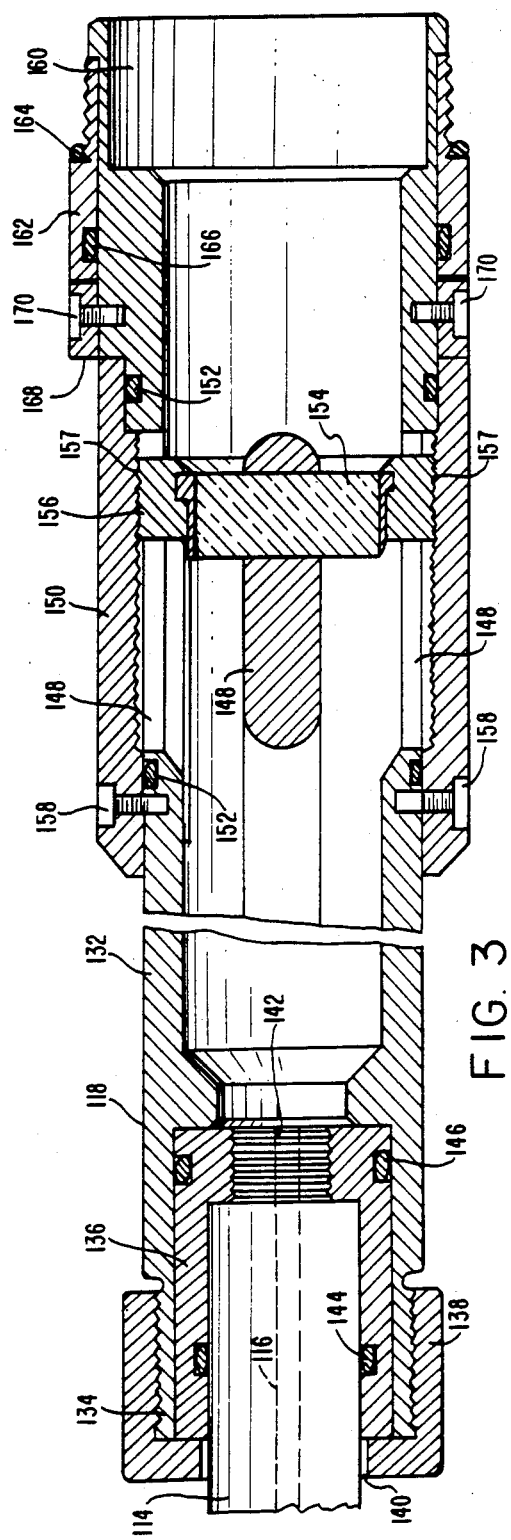
FIG. 2
FIG. 3

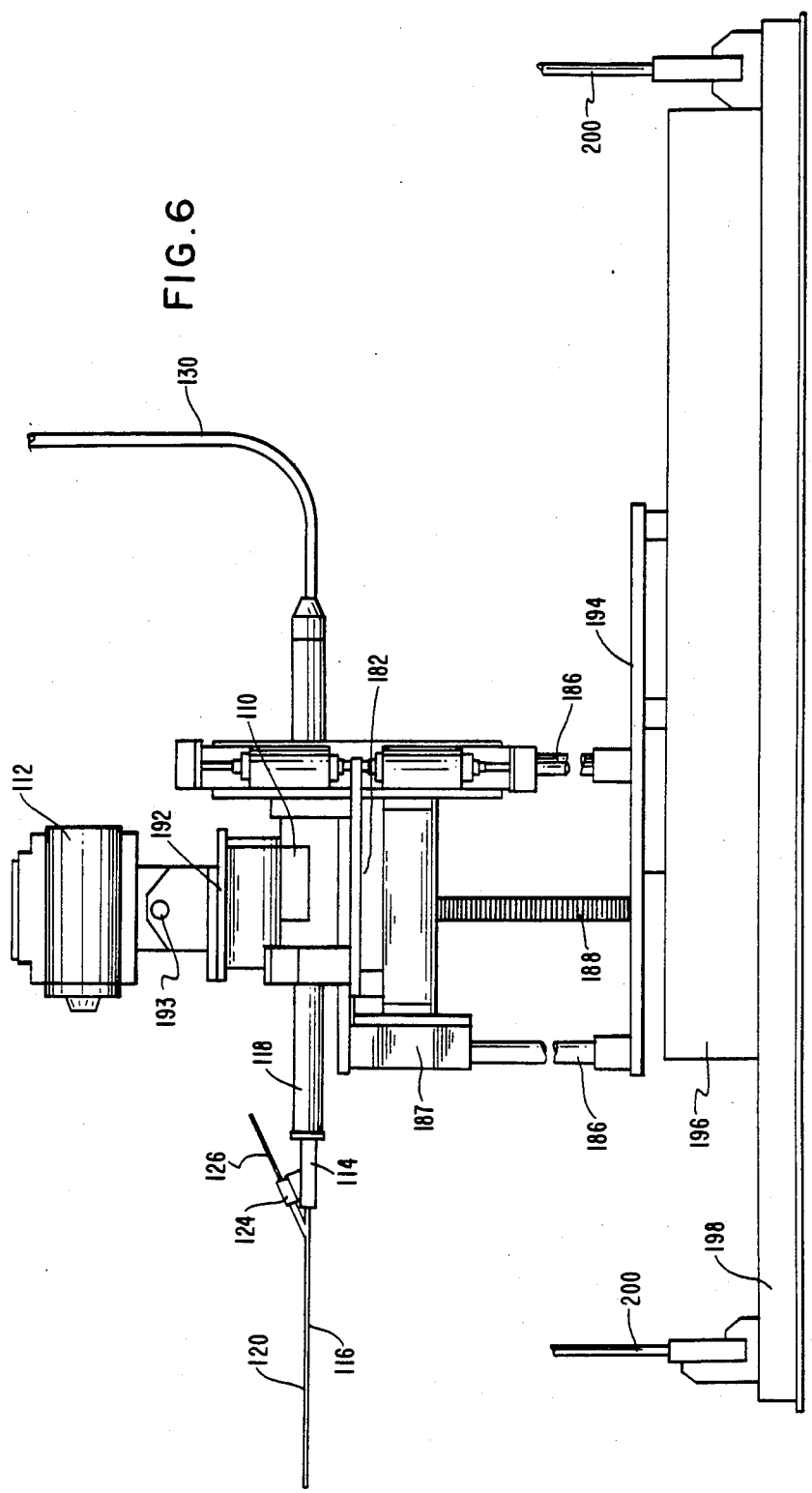

VISUAL INSPECTION SYSTEM FOR RADIOACTIVE FUEL ASSEMBLIES USING FIBEROPTICS

BACKGROUND OF THE INVENTION

The present invention relates in general to a visual inspection system suitable for gaining access within relatively small openings, and more particularly, to such a visual inspection system arranged in an underwater radioactive environment using fiberoptics for visually inspecting objects such as, for example, radioactive nuclear fuel assemblies.

In water cooled nuclear reactors, a plurality of elongated fuel elements and control element guide tubes are arranged, as a closely spaced array, in a unified structure known as a fuel assembly. The fuel elements are generally constructed from elongated cylindrical metal tubes containing nuclear fuel pellets and having both ends sealed by end plugs. These fuel assemblies are arranged in a vertically disposed lattice to form the reactor core. Typical reactor cores of this type are described and illustrated in U.S. Pat. No. 4,381,284.

Spent radioactive fuel assemblies are generally maintained underwater, for cooling and shielding purposes, during removal from a reactor and stored initially in a spent fuel pool. Although the fuel elements are designed to withstand the effects of the reactor operating environment, including those due to coolant hydraulics, reactor temperature and pressure, fission gas pressure, fuel expansion, and irradiation growth, defects in the fuel elements can occur which, if gone undetected, could permit the escape of radioactive fission products. It is, therefore, desirable and often necessary to inspect the fuel elements for such defects as cracks, reduction of thickness, deformation, impression and corrosion, so that corrective action, for example, replacement and/or repair of defective or failed fuel elements may be undertaken. On one hand, locating a defective fuel element within a fuel assembly is extremely difficult since such an assembly is radioactive and may contain hundreds of closely spaced fuel elements and guide tubes. On the other hand, disassembling and reassembling of these fuel assemblies is time consuming and may, in itself, result in fuel element damage. Thus, it can be appreciated that it is important to have a reliable system for locating defective fuel elements arranged in a closely spaced array and for the visual inspection thereof.

In reactors utilizing a liquid coolant, a number of devices and techniques have been proposed for locating individual defective fuel elements within the fuel assembly based upon detection and analysis of vibration, temperature differentials or ultrasonic phenomenon. These prior art detection devices and techniques have required, in general, that the fuel assemblies be at least partially disassembled as they do not permit access between the closely spaced fuel elements and guide tubes. Furthermore, these detection devices and techniques rely upon the dynamics of thermodynamic changes of state of the fluid which has leaked into the defective fuel element, typically boiling or condensation or both. One such prior art detection device which neither requires disassembling of the fuel assembly nor is dependent upon boiling or condensation of fluid within the fuel elements, is disclosed in U.S. Pat. No. 4,174,255. This detection device utilizes a transducer for emitting ultrasound in the megahertz frequency range for detecting water within the fuel element, indicative of a defective condition, or the presence of gas within the fuel element, indicative of a fuel element being free from any defects. However, such prior art detection device is not suitable for locating the specific defect, should one be present, nor for allowing the visual inspection of such a defect for identification of its type and severity.

Accordingly, it can be appreciated that there is an unsolved need for a radioactive fuel assembly inspection system adapted for locating defective fuel elements arranged in a closely spaced array, as well as permitting the visual inspection of such defects without the need of at least the partial disassembling of the fuel assembly.

SUMMARY OF THE INVENTION

It is broadly an object of the present invention to provide a visual inspection system for objects such as, for example, radioactive fuel assemblies using fiberoptics which overcomes or avoids one or more of the foregoing disadvantages resulting from the use of the above-mentioned prior art detection devices and techniques, and which fulfills the specific requirements of such a visual inspection system for use in an underwater radioactive environment in a spent fuel pool. Specifically, it is within the contemplation of one aspect of the present invention to provide a visual inspection system for radioactive fuel assemblies using fiberoptics constructed for prolonged use in a radiation environment without substantial loss of their light transmission characteristics.

A further object of the present invention is to provide a visual inspection system for radioactive fuel assemblies permitting access within the relatively small openings on the order of 0.070 inches between the fuel elements along the x, y and z axes of the fuel assembly.

A still further object of the present invention is to provide a visual inspection system for radioactive fuel assemblies which is adapted for use in an underwater environment and which is subjected to nuclear radiation.

A yet still further object of the present invention is to provide a visual inspection system for radioactive fuel assemblies which does not require at least the partial disassembling of the fuel assemblies for detection and visual inspection of defects within the fuel elements.

A yet still even further object of the present invention is to provide a visual inspection system for radioactive fuel assemblies using fiberoptics which permits monitoring and visual inspection of defects at a location remote from the fuel assembly.

An additional object of the present invention is to provide a visual inspection system for radioactive fuel assemblies which permits direct illumination of those portions of the fuel elements being visually inspected.

In accordance with one embodiment of the present invention, there is described and illustrated a system for the visual inspection of a radioactive object in an underwater environment. The system is constructed of a fiberoptic image guide for transmitting an image of preselected portions of the object to be visually inspected, a light source for emitting light, transmitting means for transmitting the light emitted from the light source to the preselected portions of the object, and receiving means arranged in the underwater environment for receiving the image transmitted by the fiberoptic image guide and for displaying the image at a position without the underwater environment and remote from the fiberoptic image guide.

Further in accordance with the present invention, the transmitting means comprises a fiberoptic light guide arranged adjacent the fiberoptic image guide for transmitting the light to the preselected portions of the object and including further positioning means arranged in the underwater environment for positioning one end of the fiberoptic image guide and the fiberoptic light guide at a plurality of the preselected portions along three mutually perpendicular axes of the radioactive object.

Still further in accordance with the present invention, there is provided focusing and enlarging means arranged between the fiberoptic image guide and the receiving means for focusing and enlarging the image within the receiving means, wherein the focusing and enlarging means comprises an adapter having a lens movably mounted along the longitudinal axis thereof for focusing and enlarging within the receiving means the image transmitted by the fiberoptic image guide.

Still further in accordance with the present invention, the adapter comprises a body having one end mounted to the receiving means and its other end attached to the fiberoptic image guide, a plurality of slotted openings, circumferentially arranged about the body, an internally threaded cylinder concentrically overlying the slotted openings, and a plurality of threaded guides engaging the threaded cylinder through the slotted openings and retaining the lens therebetween, whereby the rotation of the threaded cylinder about the body causes the lens to advance along the longitudinal axis of the adapter.

Still even further in accordance with the present invention, the fiberoptic image guide and the fiberoptic light guide comprise silicon dioxide material, and wherein the purity of the silicon dioxide material is sufficient to allow the guides to withstand a radiation flux of greater than about $10^4$ rads per hour or an accumulated dosage of a minimum of about $10^4$ rads such that the guides retain greater than about 50% light transmission.

BRIEF DESCRIPTION OF THE DRAWINGS

The above description, as well as further objects, features and advantages of the present invention will be more fully understood by reference to the following detailed description of the presently preferred, but nonetheless illustrative, visual inspection system for radioactive fuel assemblies using fiberoptics in accordance with the present invention, when taken in conjunction with the accompanying drawings, wherein:

FIG. 2 is a front elevational view of an adapter of the present invention for coupling a fiberscope to a closed circuit television camera system;

FIG. 3 is a cross-sectional view of the adapter shown in FIG. 1 taken along line 3—3 thereof showing the adapter having a movable lens for focusing and enlarging the image being transmitted by the fiberscope;

FIG. 6 is a front elevational view of a three axis positioning device having a fiberscope and a pair of closed circuit television cameras mounted thereto, and adapted for positioning the free end of the fiberscope along the x, y and z axes of the nuclear fuel assembly;

DESCRIPTION OF THE PREFERRED EMBODIMENT

Figure 1:
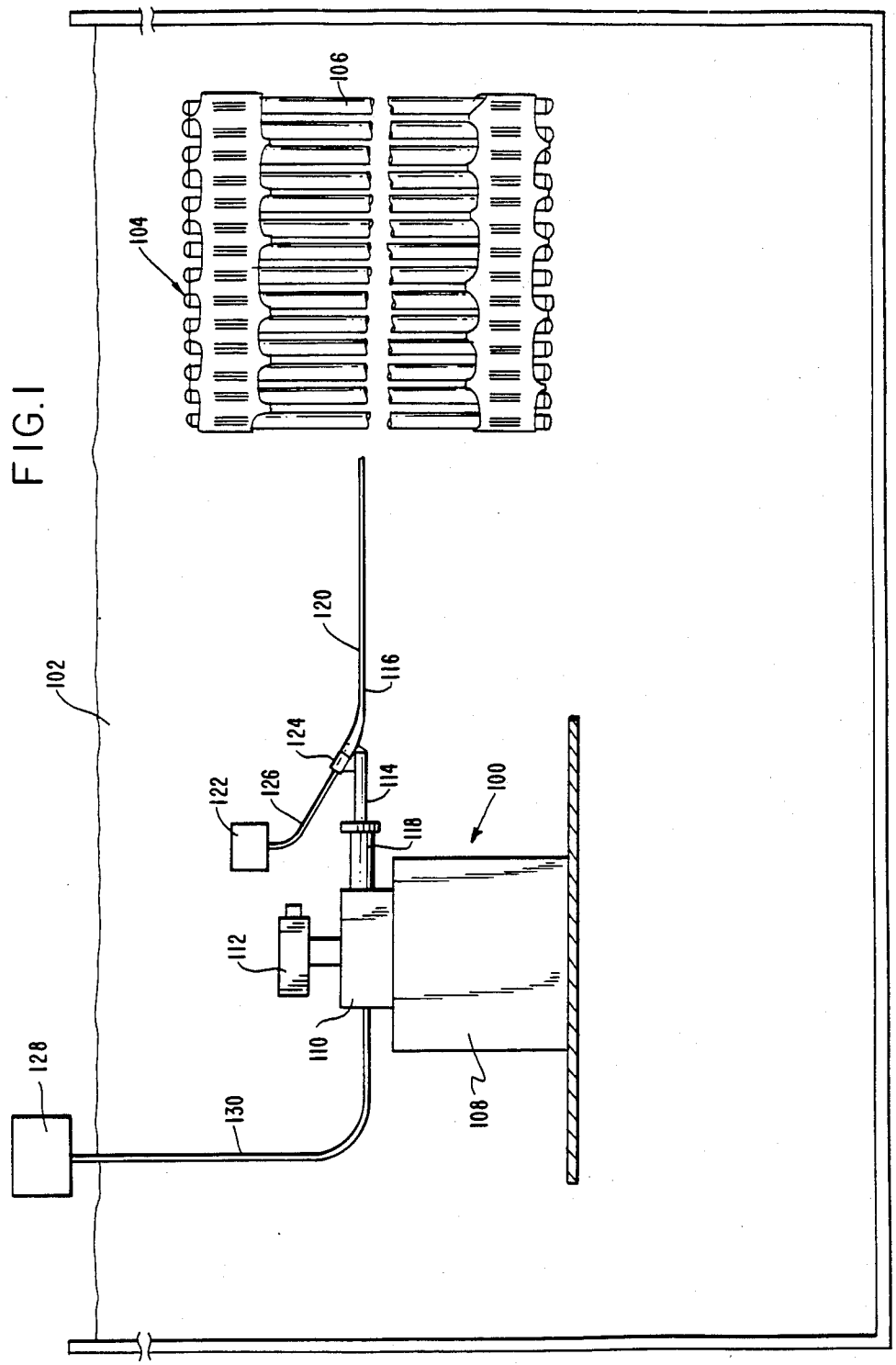
FIG. 1 is a diagrammatical illustration of the visual inspection system of the present invention arranged underwater in a spent fuel pool adjacent a radioactive fuel assembly.

Referring generally to the drawings in which like reference characters represents like elements, there is shown in FIG. 1 a diagrammatical view of a visual inspection system in accordance with the present invention for radioactive fuel assemblies or other such objects using fiberoptics and generally designated by reference character 100. As shown, the system 100 is constructed to be removably positioned within a radioactive underwater environment such as in a spent fuel pool 102 adjacent a radioactive nuclear fuel assembly 104. The fuel assembly 104 is constructed to include a plurality of vertically disposed fuel elements 106 arranged in a closely spaced array. The system 100 provides the ability to perform detailed visual inspection of the individual fuel elements 106 of the fuel assembly 104 using fiberoptic technology in a radioactive underwater environment. In this regard, the interior regions of the fuel assembly 104 which have heretofore been unaccessible, may be visually inspected for defects in the fuel elements 106 such as cracks, reduction of thickness, deformation, impression and corrosion, and the like. In general, the system 100 is constructed of an underwater, radiation resistant fiberscope/closed circuit television camera system coupled to a three axis manipulator system. More specifically, the system 100 is constructed of a three axes positioning device 108 supporting a pair of closed circuit television cameras 110, 112. A fiberscope 114 having a fiberoptic image guide 116 is connected to the camera 110 by means of an eccentric adapter 118. A fiberoptic light guide 120 is arranged adjacent the image guide 116 and connected to a high intensity light source 122 such as a laser or mercury arc lamp by means of a connector 124 and fiberoptic guide 126. A remote television monitor 128 without the fuel pool 102 is connected to the camera 110 by means of transmission line 130.

Referring now to FIGS. 2 and 3, there will be described the construction and operation of the eccentric adapter 118. The adapter 118 is constructed from a generally cylindrical hollow body 132 having a threaded end 134. A cylindrical hollow seal nut 136 is frictionally retained within the threaded end 134 of the body 132 by means of a threaded clamp nut 138. The clamp nut 138 is provided with a central opening 140 through which one end of the fiberscope 114 passes into the hollow interior of the seal nut 136. The fiberscope 114 is retained within the seal nut 136 by means of it having a threaded end 142 for engagement with a threaded portion of the seal nut. A watertight seal is formed between the fiberscope 114 and the seal nut 136 by means of O-ring 144. Likewise, a watertight seal is formed between the seal nut 136 and the body 132 of the fiberscope 118 by means of O-ring 146. As shown in FIG. 3, the image guide 116 extends through the fiberscope 114 and is arranged in alignment with the longitudinal axis of the adapter 118.

Four elongated slotted openings 148 are circumferentially arranged and equally spaced about the body 132 of the adapter 118. An internally threaded hollow cylinder 150 is arranged concentrically overlying the slotted openings 148 and sealed to the body 132 by means of a pair of O-rings 152. A lens 154 having its transverse axis arranged in alignment with the longitudinal axis of the image guide 116 extending within the fiberscope 114 is movably arranged within the interior of the body 132. The lens 154 is movably retained by means of four circumferentially arranged threaded guides 156 having threaded ends 157 extending through the slotted openings 148 and into engagement with the threaded portion of the concentrically overlying cylinder 150. As should now be apparent, rotation of the cylinder 150 causes movement of the lens 154 along the longitudinal axis of the adapter 118 by means of the threaded guides 156. In this manner, the image being transmitted by the image guide 116 may be focused and enlarged. The precise position of the lens 154 along the longitudinal axis of the adapter 118 may be retained by the set screws 158 extending through the cylinder 150 into engagement with the body 132 of the adapter.

The right end of the adapter 118, as viewed in FIG. 3, is constructed to be eccentrically connected to the camera 110 such as Westinghouse ETV-1250 series cameras. In this regard, the right end of the adapter 118 is provided with an opening 160 having its transverse axis arranged not in alignment with the transverse axis of the lens 154, as well as not in alignment with the longitudinal axis of the image guide 116 extending through the fiberscope 114. As should now be apparent, rotation of the adapter 118 about its longitudinal axis causes the image being transmitted by the image guide 116 to be rotated about a circular path. In this regard, the image being transmitted by the image guide 116 may be centrally focused on the image receiving elements (not shown) contained within the camera 110 so as to overcome any misalignment between the lens 154 and the image receiving elements resulting from lack of precision in the construction of the mating parts of the adapter and camera. Specifically, the adapter 118 is mounted to the camera 110 by means of a threaded cylindrical head connector 162. A watertight seal is provided at the connection of the head connector 162 and the camera 110 by means of an O-ring 164. Likewise, a watertight seal is provided between the head connector 162 and the body 132 of the adapter 118 by means of an O-ring 166. The head connector 162 is maintained on the right end of the adapter 118 by means of a head connector retaining ring 168 and set screws 170 extending through an opening therein and into engagement with the body 132 of the adapter. As thus far described, the adapter 118 provides an integral watertight connection between the fiberscope 114 and camera 110 for focusing and enlarging the image being transmitted by the image guide 116 to the image receiving elements within the camera.

The system 100, being employed in a radiation environment, requires that the fiberoptic image guide 116, as well as the fiberoptic light guide 120 be constructed of materials to withstand radiation exposure while maintaining acceptable light transmission characteristics. The radiation resistant nature of the image guide 116 and light guide 120 permit their exposure to various dosages of radiation while retaining greater than about 50% light transmission. The core region of the image guide 116 and light guide 120 are manufactured from ultrapure silicon dioxide material i.e., having less than 5-10 parts per billion of impurities. Typically, the image guide 116 and light guide 120 made of such material can withstand a radiation flux of greater than about $10^4$ rads per hour or an accumulated radiation dosage of greater than $10^4$ rads. Similarly, the lens 154 of the adapter 118 is also manufactured from ultrapure silicon dioxide material.

The fiberoptic image guide 116 is constructed from a plurality of individual fibers arranged in a coherent bundle. By coherent bundle is meant that the relative x-y position of one end of each fiber is at the same relative x-y position at its other end. In this manner, the relative x-y position of the image being transmitted by a fiber is maintained from one end to the other. The coherent bundle of the image guide 116 includes from 1,000 to 20,000 individual fibers each having a core diameter in the range of about 3 to 24 microns and an overall diameter in the range of from about 5 to 30 microns and having a numerical aperture of about 0.2, i.e., square root of the difference between the squares of the index of refraction of the core and cladding materials. On the other hand, the light guide 122 is not required to be manufactured of a coherent bundle of fibers. For the transmission of one wavelength of light, the image guide 120 can be manufactured from a single fiber having a core diameter of about 400 microns, however, multiple fibers can be used for transmission of a band of wavelengths of light, again made of ultrapure silicon dioxide material.

Figure 4A:
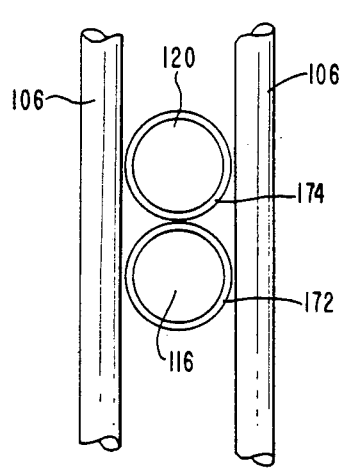
FIG. 4a is a front elevational view of one embodiment of the arrangement of a fiberoptic image guide and fiberoptic light guide having a figure 8-shaped cross-section and disposed between a pair of fuel elements.
Figure 4B:
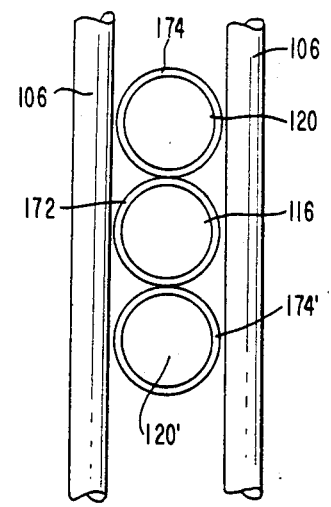
FIG. 4b is a front elevational view showing a second embodiment of an arrangement of a fiberoptic image guide sandwiched between a pair of fiberoptic light guides arranged along a straight line to facilitate insertion thereof between a pair of fuel elements.

Referring to FIGS. 4a-4b, two embodiments of an arrangement of the image guide 116 and light guide 120 will now be described. As shown in FIG. 4a, the image guide 116 and light guide 120 are each enclosed in a thin stainless steel tube 172, 174, respectively. The tube 174 of the light guide 120 is welded to the tube 172 of the image guide 116 to form an integral assembly having a transverse cross-section in a figure 8-shape. This cross-section allows the integral assembly of the image guide 116 and light guide 120 to be thin enough to pass through very narrow channels formed between adjacent fuel elements 106, such as 0.070 inch channels, while providing optical capabilities that would normally require channel spacings that are at least twice as wide. In accordance with the embodiment shown in FIG. 4b, a second light guide 120' having a thin stainless steel tube 174' is welded to the tube 172 of the image guide 116 to provide an integral assembly in which the light guides 120, 120' and image guide 116 area arranged lying in a common plane, i.e., wherein the guides in cross-section have their longitudinal axis arranged along a straight line. Thus, the integral assembly of the image guide 116 and light guide 120, 120' in accordance with the embodiment described can easily pass through the narrow channels formed between the fuel elements 106 within the radioactive nuclear fuel assembly 104. This embodiment is accordingly useful for illuminating both sides of the image guide 116.

Figure 5A:
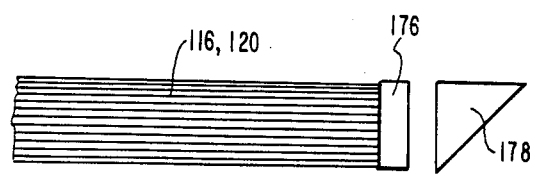
FIG. 5a is a front elevational view of the free end of either the fiberoptic light guide or fiberoptic image guide and showing such end having a focusing lens and prism positioned adjacent thereto in accordance with one embodiment.
Figure 5B:
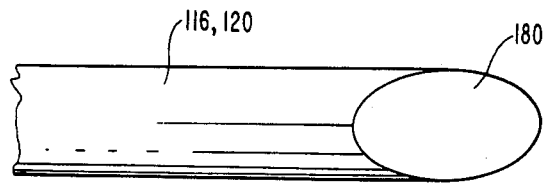
FIG. 5b is a front elevational view of the free end of either the fiberoptic light guide or fiberoptic image guide shown in FIG. 4a and showing such end having a polished elliptical face in accordance with a second embodiment.

To facilitate the inspection of a preselected portion of the tubes 106 within the fuel assembly 104, the free ends of the image guide 116 and light guide 120, as shown in FIG. 5a, are provided with a fixed focus lens 176 and a prism 178, for example, in a manner similar to that disclosed in U.S. Pat. No. 3,856,000. The lens 176 and prism 178 combination, with regard to the image guide 116, provides viewing at an angle to the longitudinal axis of the image guide. To this end, any viewing angle from 0 to 90 degrees may be employed, depending upon the specific prism used. Likewise, the lens 176 and prism 178 combination, with regard to the light guide 120, permits focusing of light on the preselected portion of the tube 106 to be inspected within the radioactive nuclear fuel assembly 104. In accordance with another embodiment, as shown in FIG. 5b, the free ends of the image guide 116 and light guide 120 may be provided with a forward oblique viewing angle as opppsed to a lens 176 and prism 178 combination. The forward oblique viewing angle is provided as an elliptically polished face 180 at the free ends of the image guide 116 and light guide 120 and being arranged at an oblique angle to the longitudinal axis of the guides, e.g., 20-60 degrees. Thus, a preselected portion of a tube 106 may be effectively illuminated by the distal end of the light guide 120 and a focused image received by the distal end of the image guide 116 to be transmitted to the television camera 110 through the adapter 118.

The selected portions of the tubes 106 of the fuel assembly 104 to be visually inspected are illuminated by the light guide 120 using the high intensity light source 122 such as helium/neon laser. However, any laser which emits any wave having a wavelength of from about 0.3 to 0.9 micrometers may be used. A suitable example is one such laser emitting a wavelength of 0.6238 micrometers. Thus, the system 100 can employ both visible and invisible light, i.e., infrared. In the preferred embodiment, the laser is connected to the light guide 120 by means of a connector 124 and fiberoptic guide 126. The laser can be arranged underwater in the spent fuel pool 102 or remote therefrom in the surrounding environment. Alternatively, a mercury arc lamp can be provided for direct illumination of the fuel elements 106 of the fuel assembly 104. In either event, the image of the preselected portion of the fuel element 106 is transmitted along the image guide 116 to the adapter 118. The lens 154 within the adapter 118 focuses and enlarges the image so as to impose the image over the entire surface of the image receiving elements within the camera 110, which camera is mounted to the three axis positioning device 108. As noted, the eccentrically mounted adapter 118 may be rotated about its longitudinal axis so as to align the center of the image being transmitted by the image guide 116 with the center of the image receiving elements within the camera 110. The camera 110 is constructed to be watertight and radiation resistant so as to enable the positioning of the camera as close as possible to the image being focused and enlarged by the lens 154 within the adapter 118 thereby minimizing transmission losses. A second camera 112 is similarly provided on the positioning device 108 so as to enable the visual monitoring of the location of the distal ends of the image guide 116 and light guide 120 with respect to the fuel elements 106. In this manner, the distal ends of the image guide 116 and light guide 120 may be monitored as the guides are inserted between the fuel elements 106 of the fuel assembly 104 while visually inspecting defects on preselected portions of the fuel elements by means of the camera 110 and remote monitor 128. The camera 112 is likewise constructed to be watertight and radiation resistant, for example, these cameras 110, 112 may be Westinghouse ETV-1250 series cameras.

Figure 7:
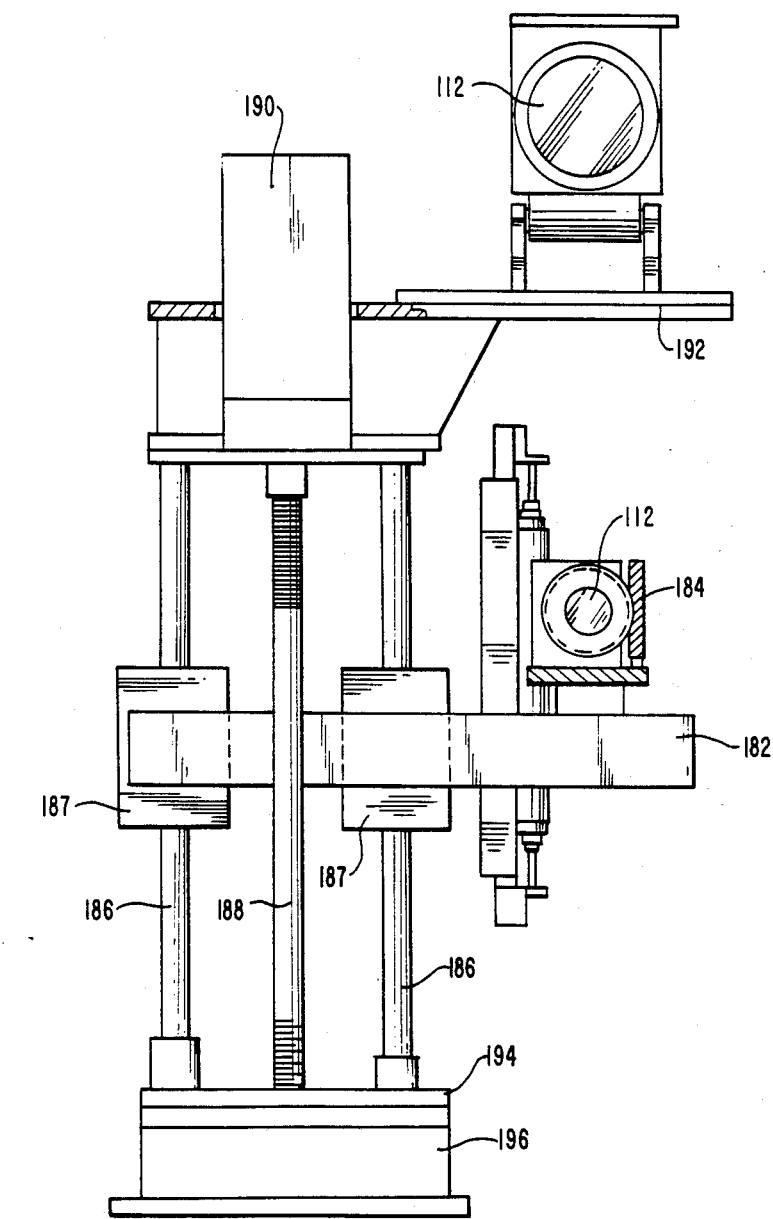
FIG. 7 is a side elevational view of the three axes positioning device shown in FIG. 6 and showing means for positioning the free end of the fiberscope along the z axis of the nuclear fuel assembly.
Figure 8:
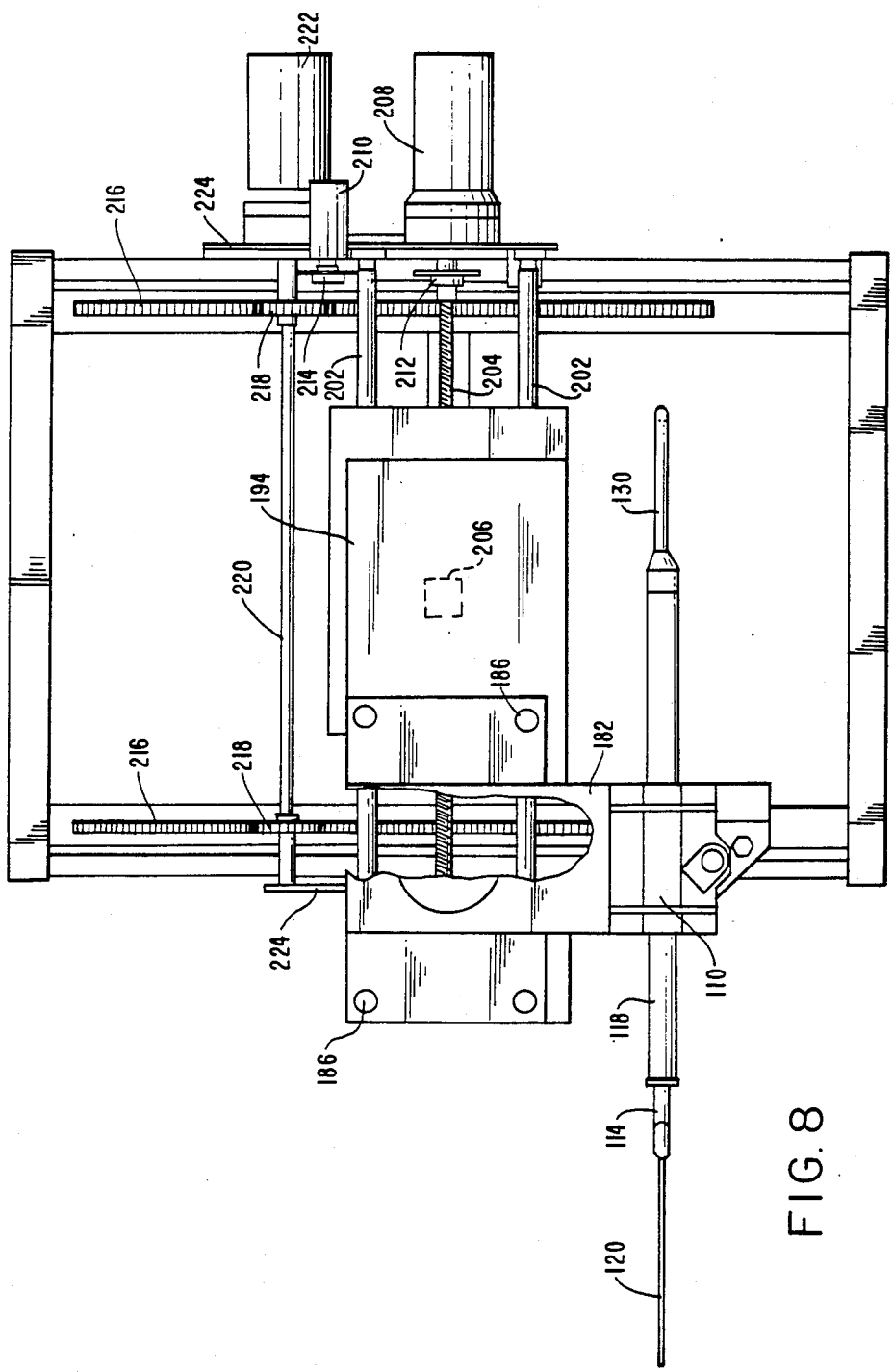
FIG. 8 is a top plan view of the three axes positioning device as shown in FIG. 6 and showing means for positioning the free end of the fiberscope along the x and y axes of the nuclear fuel assembly.

Referring now to FIGS. 6-8, the construction and operation of the three axes positioning device 108 will now be described. The positioning device 108 permits movement of the distal ends of the image guide 116 and light guide 120 along three mutually perpendicular axes, i.e., x, y and z axes of the fuel assembly 104. The camera 110 is mounted to a platform 182 and provided with a worm gear 184 for permitting controlled rotation of the camera about its longitudinal axis. Rotation of the camera 110 via the worm gear 184 causes like rotation of the distal ends of the image guide 116 and light guide 120 to facilitate viewing of predetermined portions of the fuel elements 106. The platform 182 is horizontally maintained by four rectangular spaced vertically extending rods 186 and slide blocks 187 mounted to the platform for sliding engagement with each of the rods. A vertically extending screw 188 is arranged between the rods 186 in threading engagement with a portion of the platform 182 and connected at one end to a motor 190. Rotation of the screw 188 by the motor 190 causes the platform 182 to be moved along the rods 186 in a vertical direction along the z axis of the positioning device 108 thereby causing simliar movement of the camera 110 and distal ends of the image guide 116 and light guide 120. The second television camera 112 is mounted to a similar platform 192 overlying the first platform 182. The second camera 112 is pivotably mounted to the platform 192 via pin 193 at a location in alignment with the first camera 110. The camera 112 is pivotable along the z axis of the positioning device 108 such that the distal ends of the image guide 116 and light guide 120 may be monitored irrespective of their position with respect to the x, y and z axes of the fuel assembly 104.

The lower ends of the rods 186 are secured to a platform 194 which is supported by an x-y positioning assembling 196. The positioning assembling 196 is in turn supported by a fixed platform 198 having suitable lifting rods 200 provided for raising and lowering the positioning device 108 into and out of the spent fuel pool 102. The x-y positioning assembling 196 is shown in detail in FIG. 8. Referring specifically to FIG. 8, the platform 194 is supported by a pair of parallel spaced rods 202 by means of a slide block (not shown) similar to slide blocks 187 and attached to the underside of each corner of the platform. A screw 204 is positioned midway between the rods 202 and engaging a portion of the underside of the platform by means of threaded block 206. One end of the screw 204 is coupled to a motor 208 through a gear box assembly 210 and drive belt (not shown) engaging gears 212, 214 provided on the motor and gear box assembly. Rotation of the motor 208 causes rotation of the screw 204 and ultimately transverses the platform 194 along the rods 202 and along the y axis of the positioning device 108. A pair of parallel spaced apart gear tracks 216 are arranged underlying the platform 194 in a transverse direction to the rods 202. A pair of gears 218 are connected to a shaft 220, which shaft has one end connected to a motor 222. The gears 218 are arranged in engagement with the gear tracks 216. The rods 202 and shaft 220 are commonly supported at their opposite ends between a pair of side frames 224. In this regard, rotation of the motor 222 causes the gears 218 to rotate in engagement along the gear tracks 216, thereby moving the platform 194 along the x axis of the positioning device 108. As should now be appreciated, the positioning device 108 is suitably adapted for positioning the ends of the image guide 116 and light guide 120 at a predetermined location along the three mutually perpendicular axes of the fuel assembly 104.

Briefly in operation, the three axes positioning device 108 is lowered into the spent fuel pool 102 adjacent the radioactive nuclear fuel assembly 104 by means of the lifting rods 200. The distal ends of the image guide 116 and light guide 120 can be positioned interiorly within the fuel assembly 104 for visual inspection of a predetermined portion of the fuel elements 106 by means of the positioning device 108. Rotation of the motor 190 will effect displacement of the ends of the image guide 116 and light guide 120 along the z axis of the fuel assembly 104, rotation of the motor 208 will cause displacement of the ends of the guides along the y axis of the fuel assembly and rotation of the motor 222 will cause displacement of the distal ends of the guides along the x axis of the fuel assembly. The respective position of the ends of the image guide 116 and light guide 120 may be continuously monitored by means of the closed circuit television camera 112. To facilitate location of the preselected portion of the fuel elements 106 to be visually inspected, the image guide 116 and light guide 120 may be rotated about their axes by means of the worm gear 184 connected to the closed circuit television camera 110, which camera receives the images of those portions of the fuel elements 106 being inspected using the remote monitor 128. The fuel elements 106 are illuminated by the high intensity light source 122 such as a laser coupled to the light guide 120 or use of, for example, a mercury arc lamp.

Accordingly, there has been described a system for the visual inspection of objects such as, for example, radioactive nuclear fuel assemblies having a plurality of fuel elements arranged in an underwater environment in a spent fuel pool. The system is constructed of a fiberoptic image guide having a core of silicon dioxide material for transmitting an image of preselected portions of the fuel elements of the fuel assembly, the image guide includes a plurality of individual fibers arranged in a coherent bundle, a light source for emitting light, transmitting means for transmitting the light emitted from the light source to illuminate the preselected portions of the fuel elements, first receiving means arranged in the underwater environment for receiving the image transmitted by the image guide and for displaying the image at a position without the underwater environment and remote from the fiberoptic image guide, second receiving means arranged in the underwater environment for visually locating one end of the image guide with respect to the preselcted portions of the fuel elements, and positioning means arranged in the underwater environment and supporting the first and second receiving means thereon, the positioning means positioning the ends of the image guide at a plurality of preselected portions of the fuel elements along three mutually perpendicular axes of the fuel assembly.

Although the invention herein has been described with reference to particular embodiments, it is to be understood that these embodiments are merely illustrative of the principals and application of the present invention. It is to be understood that numerous modifications may be made in the illustrative embodiments and that other arrangements may be devised without departing from the spirit and scope of the present invention as defined by the pending claims.

What is claimed is:

1. A system for the visual inspection of a radioactive assembly of tubes in an underwater environment, comprising an elongated fiberoptic image guide for remotely transmitting an image of said tubes to be visually inspected, a light source for emitting light, an elongated fiberoptic light guide for transmitting said light emitted from said light source to said tubes, the distal end of the image guide being parallel and adjacent to one side of the light guide so that the distal ends of the image guide and light guide present an elongated cross section that facilitates the insertion of said distal ends in the spaces between the tubes, a first receiving means for remotely displaying the image conducted by said image guide, a second receiving means for remotely displaying the location of the distal ends of said adjacent image and light guides to facilitate the positioning thereof within said assembly, a positioning means for remotely positioning said distal ends of said image and light guide, and means for mechanically linking said second receiving means with said positioning means so that when said image and light guides are moved, said second receiving means is moved the same amount, wherein the image guide is formed from silicon dioxide of a purity sufficient to allow said image guide to withstand a radiation flux of greater than about $10^4$ rads per hour so that said guide retains greater than about 50% light transmission.

2. The system of claim 1, wherein said radioactive assembly of tubes comprises a nuclear fuel assembly having a plurality of longitudinally extending tubes between which said fiberoptic image guide and said fiberoptic light guide are positioned.

3. The system of claim 1 wherein said positioning means positions said fiberoptic image guide and said fiberoptic light guide at a plurality of said preselected portions along three mutually perpendicular axes of said radioactive assembly.

4. The system of claim 2 wherein the cross-sectional shape of said distal ends of the image guide and said light guide are substantially round and arranged adjacent to each other in a figure-8 shape.

5. The system of claim 4 further including a second light guide arranged adjacent said image guide on the side opposite the first light guide, wherein said guides have their longitudinal axes arranged substantially parallel to one another.

6. The system of claim 1 wherein the light guide is also formed of silicon dioxide material to allow said light guide to withstand a radiation flux of greater than about $10^4$ rads per hour such that said guide retains greater than about 50% light transmission.

7. The system of claim 1 further including focusing and enlarging means arranged between said fiberoptic image guide and said first receiving means for focusing and enlarging said image within said receiving means.

8. The system of claim 7 wherein said first receiving means includes monitoring means for visually monitoring said images focused and enlarged within said first receiving means, said monitoring means being positioned remote from said fiberoptic image guide.

9. The system of claim 7 wherein said focusing and enlarging means comprises an adapter having a lens movably mounted along the longitudinal axis thereof for focusing and enlarging within said first receiving means said image transitted by said image guide.

10. The system of claim 9 wherein said adapter comprises a body having one end mounted to said receiving means and its other end attached to said image guide, a plurality of slotted openings circumferentially arranged about said body, an internally threaded cylinder concentrically overlying said slotted openings, and a plurality of threaded guides engaging said threaded cylinder through said slotted openings and retaining said lens therebetween, whereby the rotation of said threaded cylinder about said body causes said lens to advance along the longitudinal axis of said adapter.

11. The system of claim 9 wherein said adapter is eccentrically mounted to said first receiving means for centering said image within said receiving means.

12. The system of claim 9 wherein said first receiving means comprises a television camera.

13. The system of claim 1 wherein said light source comprises a laser arranged in said underwater environment.

14. The system of claim 13 wherein said laser emits light having a wavelength in the range of about from 0.3 to 0.9 micrometers.

15. The system of claim 1 further including a lens and prism in combination arranged adjacent one end of said fiberoptic image guide for focusing an image of preselected portions of said tubes thereat.

16. The system of claim 1 wherein the face of one end of said fiberoptic image guide is arranged at an oblique angle to the longitudinal axis of said guide for focusing an image of preselected portions of said tubes thereat.

17. The system of claim 1 wherein said image guide comprises a plurality of individual optical fibers arranged in a bundle.

18. The system of claim 17 wherein said individual fibers are arranged in a coherent bundle whereby the x-y position of one end of each of said fibers are at the same x-y position at their other end.

19. The system of claim 17 wherein said individual fibers have a numerical aperture of about 0.2.

20. The system of claim 19 wherein said individual fibers include a core having a diameter in the range of about 5 to 30 microns.

21. A system for the visual inspection of a radioactive assembly having a plurality of tubes arranged in an underwater environment, said system comprising a fiberoptic image guide having a core of silicon dioxide material for transmitting an image of preselected portions of said tubes of said fuel assembly, said image guide including a plurality of individual fibers arranged in a coherent bundle, a light source for emitting light, a light guide also having a core of silicon dioxide for transmitting said light emitted from said light source to illuminate said preselected portions of said tubes, wherein the distal end of the guide is oriented parallel and adjacent to one side of the light guide present an elongated cross section that facilitates insertion between the tubes of the assembly, first receiving means arranged in said underwater environment for receiving said image transmitted by said image guide and for displaying said image at a position outside of said underwater environment and remote from said fiberoptic image guide, second receiving means arranged in said underwater environment for remotely visually locating one end of said image guide with respect to said preselected portions of said tubes, and positioning means arranged in said underwater environment and supporting said first and second receiving means thereon, said positioning means positioning the ends of said image guide at a plurality of said preselected portions of said tubes along three mutually perpendicular axes of said fuel assembly, said positioning means being controlled at least in part in response to the information generated by the second receiving means, wherein the purity of the silicon dioxide forming the image guide and the light guide is sufficient to allow said guides to withstand a radiation flux of greater than about $10^4$ rads per hour so that said guides retain greater than about 50% light transmission.

22. The system of claim 21 wherein said first and second receiving means comprise television cameras.

23. The system of claim 21 wherein said light guide comprises a fiberoptic light guide having a substantially round distal end for transmitting said light to illuminate said preselected portions of said tubes and wherein said image guide has a substantially round distal end, the distal end of said light guide being arranged adjacent and parallel to the distal end of said image guide such that said guides have a figure-8 shape cross section in order to facilitate the insertion of the distal ends of the image and light guide between the tubes of the nuclear fuel assembly.

24. The system of claim 23 further including a second fiberoptic light guide arranged adjacent and parallel to the image guide on the side opposite said first light guide, so that said guides in cross-section have substantially parallel longitudinal axes.

25. The system of claim 21 further including an adapter having one end mounted to said first receiving means and its other end attached to said image guide and a lens movably mounted within said adapter for focusing and enlarging said image transmitted by said image guide within said first receiving means.

* * * * *